(12) United States Patent
Zilka et al.

(10) Patent No.: US 7,305,625 B1
(45) Date of Patent: *Dec. 4, 2007

(54) DATA NETWORKING SYSTEM AND METHOD FOR INTERFACING A USER

(75) Inventors: Kevin J. Zilka, San Jose, CA (US); Dominic M. Kotab, San Jose, CA (US)

(73) Assignee: Aloft Media, LLC, Longview, TX (US)

( * ) Notice: Subject to any disclaimer, the term of this patent is extended or adjusted under 35 U.S.C. 154(b) by 832 days.

This patent is subject to a terminal disclaimer.

(21) Appl. No.: 10/691,061

(22) Filed: Oct. 22, 2003

Related U.S. Application Data (63) Continuation-in-part of application No. 10/254,410, filed on Sep. 24, 2002.

(60) Provisional application No. 60/324,941, filed on Sep. 24, 2001.

(51) Int. Cl.
G06F 3/00 (2006.01)

(52) U.S. Cl. .................................................. 715/739

(58) Field of Classification Search ................. 715/738, 715/739, 740, 760
See application file for complete search history.

(56) References Cited

U.S. PATENT DOCUMENTS

| | | | | |
|---|---|---|---|---|
| 5,029,013 A | | 7/1991 | Hiratsuka et al. ........... | 358/335 |
| 5,540,597 A | | 7/1996 | Budman et al. ............... | 439/77 |
| 6,012,093 A | * | 1/2000 | Maddalozzo et al. ....... | 709/223 |
| 6,028,602 A | | 2/2000 | Weidenfeller et al. ...... | 345/340 |
| 6,081,829 A | | 6/2000 | Sidana ........................ | 709/203 |
| 6,230,171 B1 | | 5/2001 | Pacifici et al. ............... | 707/512 |
| 6,243,091 B1 | * | 6/2001 | Berstis ........................ | 715/839 |
| 6,434,580 B1 | | 8/2002 | Takano et al. ............... | 707/530 |
| 6,460,058 B2 | | 10/2002 | Koppolu et al. .......... | 707/501.1 |
| 6,571,295 B1 | | 5/2003 | Sidana ........................ | 709/246 |
| 6,667,751 B1 | * | 12/2003 | Wynn et al. ................. | 715/833 |
| 6,697,838 B1 | | 2/2004 | Jakobson ..................... | 709/203 |
| 6,973,616 B1 | | 12/2005 | Cottrille et al. ............. | 715/512 |
| 7,028,253 B1 | | 4/2006 | Lieberman et al. ......... | 715/512 |

(Continued)

FOREIGN PATENT DOCUMENTS

GB 2339374 1/2000

(Continued)

OTHER PUBLICATIONS

Microsoft Internet Explorer Ver.6.0.2800, Copyright 1995-2001.*

(Continued)

*Primary Examiner*—Kristine Kincaid
*Assistant Examiner*—Thanh Vu
(74) *Attorney, Agent, or Firm*—Zilka-Kotab, PC (57) ABSTRACT

An interface is provided for data networking. Included is a network browser window associated with a network browser for displaying content associated with uniform resource locators (URLs) during network browsing. Also displayed is a plurality of identifiers adjacent to or separate from the window in which the content is displayed. In use, a user is allowed to pre-select at least one of the identifiers. Moreover, after the pre-selection, content associated with at least one URL displayed during use of the network browser is correlated with the pre-selected identifier.

23 Claims, 4 Drawing Sheets

U.S. PATENT DOCUMENTS

| | | | |
|---|---|---|---|
| 7,117,443 B1 | 10/2006 | Zilka et al. | 715/739 |
| 7,194,691 B1 | 3/2007 | Zilka et al. | 715/739 |
| 2002/0007373 A1 | 1/2002 | Blair et al. | 707/505 |
| 2002/0019837 A1 | 2/2002 | Balnaves | 707/512 |
| 2002/0032659 A1 | 3/2002 | Waters | 705/54 |
| 2002/0035799 A1 | 3/2002 | Germeraad et al. | 705/9 |
| 2002/0059076 A1 | 5/2002 | Grainger et al. | 705/1 |
| 2002/0070963 A1 | 6/2002 | Odero et al. | 345/739 |
| 2002/0077835 A1 | 6/2002 | Hagelin | 705/1 |
| 2002/0082778 A1 | 6/2002 | Barnett et al. | 702/1 |
| 2002/0093528 A1 | 7/2002 | Grainger | 345/738 |
| 2002/0111953 A1 | 8/2002 | Snyder | 707/101 |
| 2002/0169743 A1 | 11/2002 | Arnold et al. | 707/1 |
| 2003/0036945 A1 | 2/2003 | Del Vecchio et al. | 705/10 |
| 2003/0046307 A1 | 3/2003 | Rivette et al. | 707/104.1 |
| 2003/0076352 A1 | 4/2003 | Uhlig et al. | 345/738 |
| 2003/0172020 A1 | 9/2003 | Davies et al. | 705/36 |
| 2004/0181427 A1 | 9/2004 | Stobbs et al. | 705/1 |
| 2004/0193697 A1 | 9/2004 | Grosvenor et al. | 709/217 |
| 2004/0205537 A1 | 10/2004 | Graham et al. | 715/511 |
| 2005/0059076 A1 | 3/2005 | Merkulov et al. | 435/6 |
| 2005/0193330 A1 | 9/2005 | Peters | 715/513 |
| 2006/0212795 A1 | 9/2006 | Cottrille et al. | 715/512 |

FOREIGN PATENT DOCUMENTS

| | | |
|---|---|---|
| JP | 2002366797 | 12/2002 |
| WO | 01/35277 | 5/2001 |
| WO | 02/05150 A2 | 1/2002 |

OTHER PUBLICATIONS

"New Internet Explorer 5.5 Technologies Designed to Support Rich" Interactive Web Application, Jul. 12, 2000.

"Internet Explorer 5.X Basics" Release Date for IE 5.5, Jul. 12, 2000.

Microsoft Internet Explorer v. 6.0, Released at least as early as Aug. 2001.

Netscape Navitgator v. 6.1, Released at least as early as Jun. 2001.

Freedman, Alan, "The Computer Desktop Encyclopedia", AMACOM 1996.

Microsoft press Computer Dictionary third Edition Microsoft Press, 1997.

http://www.open-ideas.org/, Open Ideas, Apr. 6, 2001.

http://www.open-ideas.org/ , Open Ideas, Apr. 9, 2001.

Roberts, Bill, Solving the Value Equation, Knowledge management Magazine, Jan. 2001.

"Internet Basics" IE 5.5, p. 7, Release date for IE 5.5, Jul. 12, 2000.

"Getting Started with PatentLab-II; a Sample Analysis Scenario Included ", Wisdomain, Inc., Verion 1.1, May 6, 2000.

Dialog Pocket Guide, The Dialog Corporation, Copyright Date Of 1998.

www.uspto.gov retrieved from the Internet Archive Wayback Machine.

\* cited by examiner

DATA NETWORKING SYSTEM AND METHOD FOR INTERFACING A USER

RELATED APPLICATION(S)

The present application is a continuation-in-part of prior U.S. patent application Ser. No. 10/254,410 filed Sep. 24, 2002, which claims priority from U.S. provisional application 60/324,941, filed Sep. 24, 2001.

FIELD AND BACKGROUND OF THE INVENTION

The present invention relates to networking, and more particularly to data networking interfaces.

DISCLOSURE OF THE INVENTION

An interface is provided for data networking. Included is a network browser window associated with a network browser for displaying content associated with uniform resource locators (URLs) during network browsing. Also displayed is a plurality of identifiers adjacent to or separate from the window in which the content is displayed. In use, a user is allowed to pre-select at least one of the identifiers. Moreover, after the pre-selection, content associated with at least one URL displayed during use of the network browser is correlated with the pre-selected identifier.

DETAILED DESCRIPTION

The following description is the best embodiment presently contemplated for carrying out the present invention. This description is made for the purpose of illustrating the general principles of the present invention and is not meant to limit the inventive concepts claimed herein.

Figure 1:
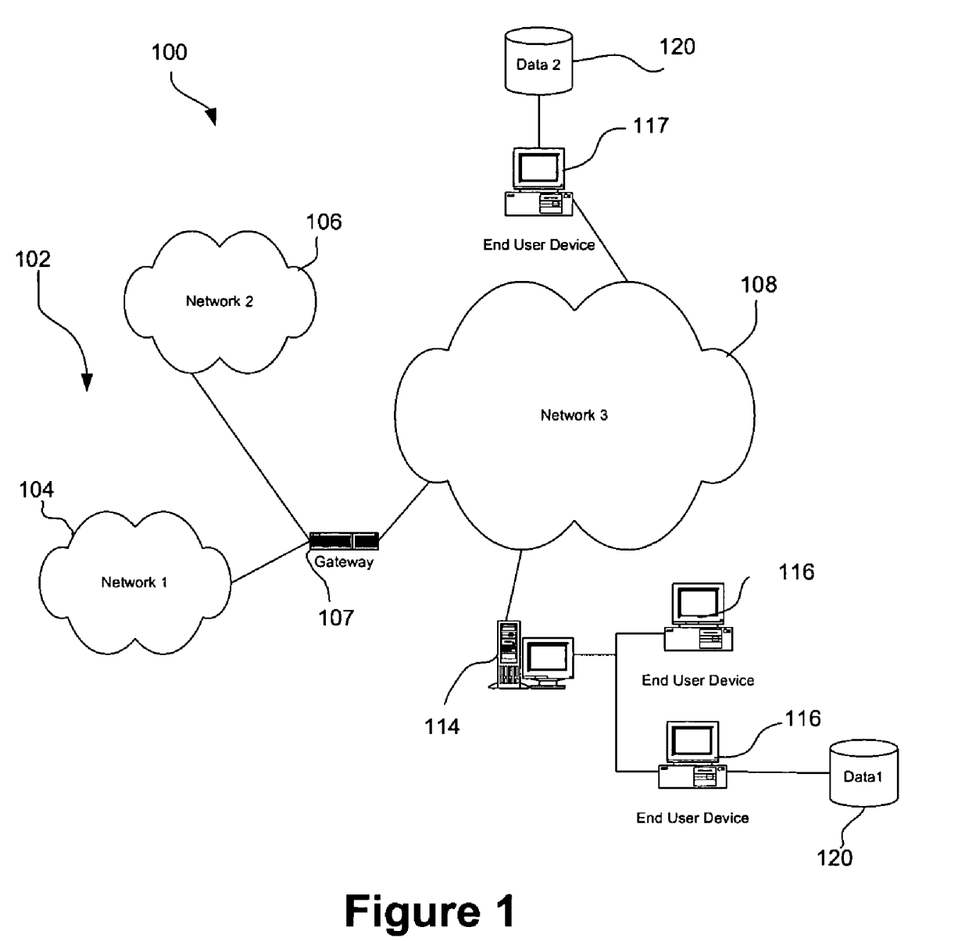
FIG. 1 illustrates a network architecture, in accordance with one embodiment.

FIG. 1 illustrates a network architecture 100, in accordance with one embodiment. As shown, a plurality of networks 102 are provided including a first network 104 and a second network 106. Also included is at least one gateway 107 coupled between the networks 102 and a third network 108. In the context of the present network architecture 100, the networks 104, 106, 108 may each take any form including, but not limited to a local area network (LAN), a wide area network (WAN) such as the Internet, a wireless network, etc. Further, any number of networks may be included.

In use, the gateway 107 serves as an entrance point from the networks 102 to the third network 108. As such, the gateway 107 may function as a router, which is capable of directing a given packet of data that arrives at the gateway 107, and a switch, which furnishes the actual path in and out of the gateway 107 for a given packet.

Further included is at least one server 114 coupled to the third network 108, and which is accessible from the networks 102 via the gateway 107. It should be noted that the server(s) 114 may include any type of computing device/groupware. Coupled to each server 114 is a plurality of user devices 116. Such user devices 116 may include a desktop computer, lap-top computer, hand-held computer, printer or any other type of logic. It should be noted that a user device 117 may also be directly coupled to any of the networks, in one embodiment.

For reasons that will soon become apparent, the user devices 116 and/or server(s) 114 may be equipped with databases 120, i.e., collections of data. Such databases may include information on intellectual property. For example, the databases 120 may include a plurality of intellectual property identifiers which each identify a specific piece of intellectual property. In the context of the present description, intellectual property refers to any patent, patent application, invention disclosure, trademark, copyright, trade secret, or any other granted or potential right in an intangible entity. In the case of patents, patent applications, and invention disclosures, the aforementioned identifier may include a patent number, patent application serial number, issue date, filling date, docket number, and/or any other information which identifies and/or is associated with the intellectual property.

Moreover, the intellectual property identifiers in the databases 120 may be owned by a particular company or other entity in the form of a docketing database or the like. In the alternative, the databases 120 may be a comprehensive set of intellectual property identifiers which are currently granted, published, and/or otherwise received by a governmental authority, i.e. United States Patent Office.

In addition, servers coupled to remote networks 104, 106 and/or the third network 108 may also have access to competing activity documentation such as online information, product information, advertising and promotional materials, etc.

Figure 2:
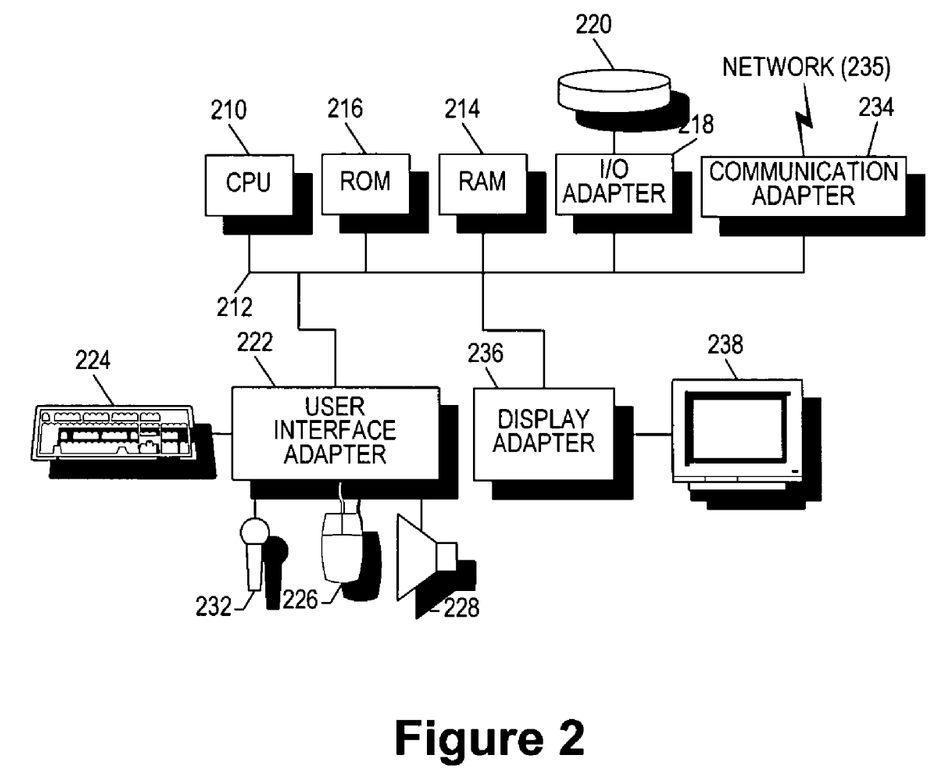
FIG. 2 shows a representative hardware environment that may be associated with the various network components of FIG. 1, in accordance with one embodiment.

FIG. 2 shows a representative hardware environment that may be associated with the various network components of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
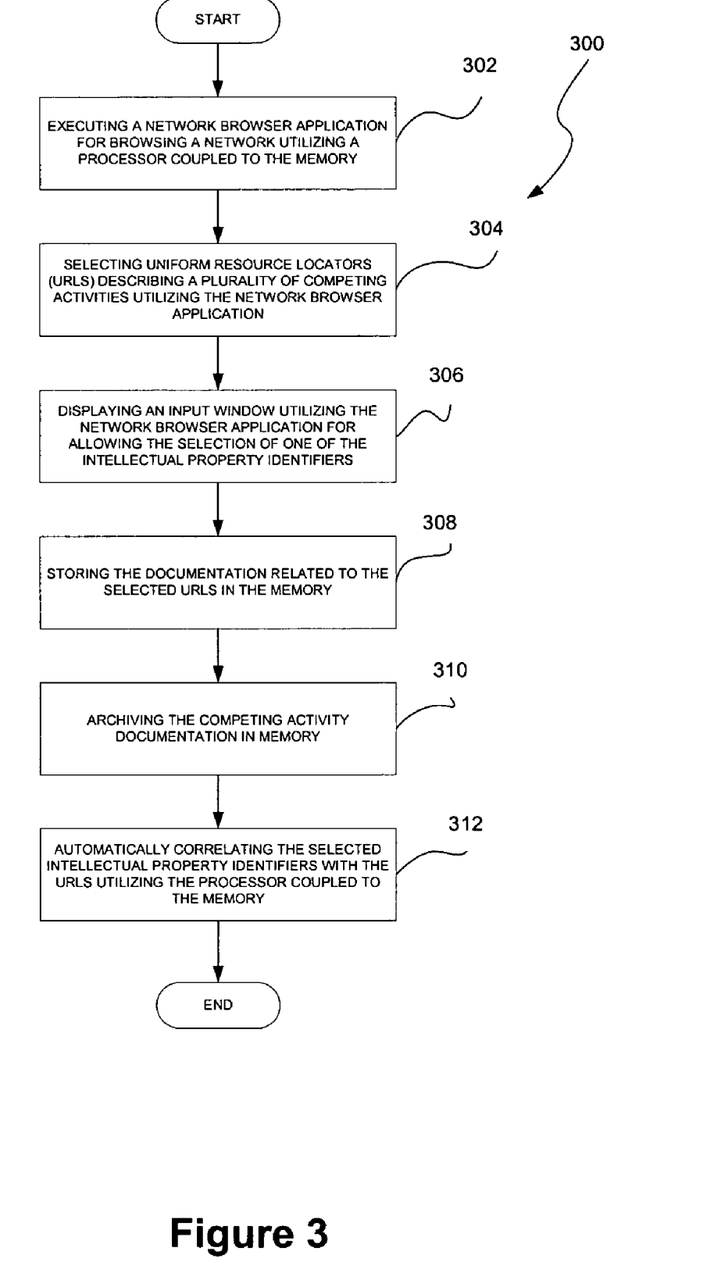
FIG. 3 illustrates a method for collecting competing activity documentation.

FIG. 3 illustrates one possible method 300 for collecting competing activity documentation. Such process begins in operation 302, by executing a network browser application for browsing a network utilizing a processor coupled to the memory (see FIG. 2). Such network browser application may include, but is not limited to MICROSOFT INTERNET EXPLORER, NETSCAPE NAVIGATOR, or any other application capable of allowing browsing of a network such as the Internet.

During use, in operation 304, uniform resource locators (URLs) to data sites/files describing a plurality of competing activities are selected utilizing the network browser application. It should be noted that such selection process may be accomplished in any desired manner, such as simply browsing the particular URL.

Once the URL has been selected, an input window may be displayed utilizing the network browser application for allowing the selection of one of the intellectual property identifiers. See operation 306. Such selection may include manual entry of one of the intellectual property identifiers, or the selection thereof via a list. More information on one exemplary embodiment of such window will be set forth in greater detail during reference to FIG. 4. In an alternate embodiment, the appropriate intellectual property identifier(s) may be identified in a window separate from the network browser application, such that any competing activity documentation selected during use of the network browser application results in automatic correlation with the pre-selected intellectual property identifier(s).

The documentation related to the selected URLs is then stored in the memory, as set forth in operations 308. Such documentation can include web pages, articles, spreadsheets, slide shows, compressed documents such as files in Portable Document Format (.pdf), etc. and can even include multimedia files and streaming multimedia. Still yet, in operation 310, the documentation related to the selected URLs may be archived for later use. This feature is critical for storing evidence of such competing activity, as content of URLs are often subject to change.

Preferably, the URL or pointer information is stored with the documentation. Also preferably, the date is also saved with the documentation to show when the documentation was discovered. The date is ideally retrieved from an independent site, such as from the National Institute of Standards and Technology site (http://nist.time.gov/timezone.cgi?Pacific/d/-8/java), so that the date is virtually indisputable.

Next, in operation 312, the selected intellectual property identifiers are correlated with the URLs utilizing the processor coupled to the memory (see FIG. 2).

Figure 4:
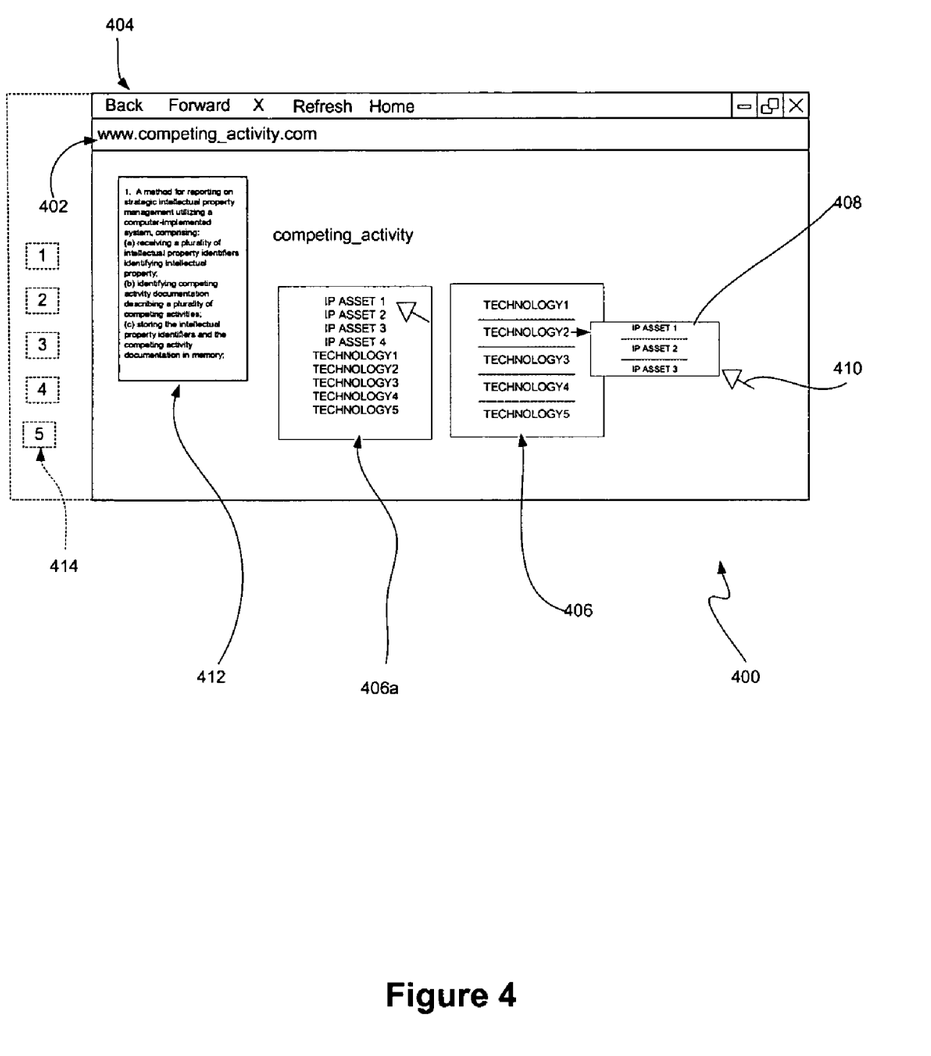
FIG. 4 illustrates an exemplary graphical user interface for collecting competing activity documentation from the Internet utilizing a network browser application, in accordance with one embodiment.

FIG. 4 illustrates an exemplary graphical user interface 400 for collecting competing activity documentation from the Internet utilizing a network browser application, in accordance with one embodiment. While the graphical user interface 400 described herein is designed for the purpose of collecting such Internet-based competing activity documentation; it should be noted that any other designs may be utilized per the desires of the user.

As shown in FIG. 4, a user may select or enter a URL using a URL field 402, in combination with a plurality of controls 404. A page or data associated with the URL is displayed on the browser, upon which a pop-up window 406 may be displayed on the network browser. It should be understood that the pop-up window 406 may be displayed in response to a certain mouse click (i.e. right mouse click), a keyboard command, or any other prompting mechanism. In the alternative, the pop-up window 406 may continuously be displayed when utilizing the network browser in a data collection mode.

In one embodiment, the pop-up window 406 may include a plurality of technology categories which may be selected for correlation with the present competing activity documentation. As an option, selection of the technology categories may prompt a sub-window 408 to be displayed showing a plurality of intellectual property identifiers previously correlated with the selected technology category. By this design, a specific technology category or intellectual property identifier may be selected with a cursor 410 in order to correlate the competing activity documentation therewith.

Note that the documentation stored may be just the content item positioned under the cursor and/or the entire page.

In an alternate embodiment, a similar pop-up window 406a may be used which delineates both technology categories and intellectual property identifiers on a single window for selection purposes.

In another alternate embodiment, the competing activity documentation (or the pointer to it) may be dragged and dropped into a "bucket" upon which it is stored as set forth above. See optional buckets 414 in FIG. 4. Further, a bucket may be provided for each technology group and/or intellectual property identifier. In the latter case, the individual bucket may be accessed by a series of submenus, such as the submenus 406, 408 described above. As an option, the various buckets may be selected (i.e. clicked) for identifying further information about the associated technology group and/or intellectual property identifier to facilitate the search and collection of competing activity.

Still yet, a claim of a particular IP asset associated with a user's search may be selectively displayed in a separate window 412 or some other manner that allows the user to inspect the claim during the search for competing activity. This window 412 may share the screen with the network browser or be placed thereover.

In any case, once selected, a URL and any associated text, links, pictures, other content, etc. may be stored for correlation with the appropriate technology categories and intellectual property identifiers. Such correlation may then be reported later, as will soon become apparent.

It should be noted that the collection of the foregoing intelligence may be a manual process which may be enhanced by the foregoing techniques. Of course, automatic "mining" techniques may be employed to automatically collect information on a periodic basis, or on a user-defined timeline. In any case, it is desired to update the information in the database on a continuous basis, i.e., in real time as data is received or daily, bi-weekly, etc.

While various embodiments have been described above, it should be understood that they have been presented by way of example only, and not limitation. For example, any of the network components may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A system for use in association with network data, comprising:
    a server,
    computer code for working in association with a network browser window associated with a network browser for displaying Internet content associated with uniform resource locators (URLs) during network browsing; and computer code for displaying a plurality of identifiers adjacent to the window in which the content is displayed;

wherein a user is allowed to select at least one of the identifiers, for correlating one of the URLs with the selected identifier;

wherein, after the selection, at least one of the URLs selected during use of the network browser is correlated with the selected identifier and stored in a manner that is dependent on a selection of the selected identifier which is distinct with respect to the at least one selected URL;

wherein the user is allowed to manually enter the selected identifier which is distinct with respect to the at least one selected URL; and computer code for storing the identifiers and the at least one selected URL on a user device that has the network browser implemented thereon;

wherein the server is capable of being in communication with the user device via a network, the server for storing the identifiers;

wherein information associated with the identifiers is stored at both the user device and the server.

2. A system, comprising:

a server;

computer code for working in association with a network browser including a back button, a forward button, a refresh button, and a home button, and for displaying a plurality of identifiers in a portion of a graphical user interface separate from a window in which content associated with uniform resource locators (URLs) is displayed; and computer code for allowing a user to select, during use of the network browser, one of the identifiers in the portion of the graphical user interface separate from the window in which the content associated with the URLs is display, for correlating, after the selection, at least one of the URLs with the selected identifier in a manner that is based on the selected identifier which is distinct with respect to the at least one URL;

wherein the user is allowed to manually enter the selected identifier which is distinct with respect to the at least one URL;

wherein the identifiers and the at least one URL are stored on a user device with the network browser executable thereon; and the server being in communication with the user device via a network, the server for storing the identifiers;

wherein the identifiers and information associated with the identifiers are stored at both the user device and the server.

3. A system as recited in claim 2, wherein the identifiers are capable of being selected for identifying further information associated therewith.

4. A system as recited in claim 2, wherein the network includes the Internet.

5. A system as recited in claim 2, and further comprising allowing the user to subsequently access the at least one URL.

6. A system as recited in claim 2, and further comprising allowing the user to subsequently access the at least one URL utilizing the identifier.

7. A system as recited in claim 2, wherein the identifiers have associated displayed buckets.

8. A system as recited in claim 7, wherein the identifiers identify the buckets.

9. A system as recited in claim 2, wherein the identifiers are accessed via menus.

10. A system as recited in claim 2, wherein the identifiers are accessed via sub-menus.

11. A system as recited in claim 2, wherein the identifiers are selected by being clicked.

12. A system as recited in claim 2, wherein the identifiers include intellectual property identifiers.

13. A system as recited in claim 2, wherein the content includes an entire web page.

14. A system as recited in claim 2, wherein the content includes documentation in a portable document format.

15. A system as recited in claim 2, wherein a date is stored with the at least one URL.

16. A system as recited in claim 15, wherein the date includes a date at which time selected displayed content was discovered.

17. A system as recited in claim 2, wherein the at least one URL is stored with associated content.

18. A system as recited in claim 2, wherein the content involves competing activity.

19. A system as recited in claim 2, wherein the information includes at least one of one or more of the URLs, the content, and information on intellectual property.

20. A computer program product embodied on a computer readable medium, comprising:

computer code for use in association with a network browser, to cause display of a plurality of identifiers in a portion of a graphical user interface different from a window in which content associated with uniform resource locators (URLs) is displayed;

computer code to permit, during use of the network browser, the receipt of a selection of one of the identifiers in the portion of the graphical user interface different from the window in which the content associated with the URLs is displayed, for correlating, after the selection at least one of the URLs with the selected identifier in a manner that is based on the selection of one of the identifiers which is separate from the at least one URL, the selection of one of the identifiers including manual entry of one of the identifiers which is separate from the at least one URL;

computer code to cause the identifiers and the at lest one URL to be stored on a user device with the network browser executable thereon;

computer code to cause the identifiers to also be stored on a server in communication with the user device via a network; and the identifiers and information associated with the identifiers being stored at both the user device and the server.

21. A computer implemented method, comprising:

in association with a network browser, displaying a plurality of identifiers in a portion of a graphical user interface different from a window in which content associated with uniform resource locators (URLs) is displayed;

receiving, during use of the network browser, a selection of one of the identifiers in the portion of the graphical user interface different from the window in which the content associated with the URLs is displayed, for correlating, after the selection, at least one of the URLs with the selected identifier in a manner that is dependent on the selection of one of the identifiers which is non-inclusive of any portion of the at least one URL, wherein the selected one of the identifiers which is non-inclusive of any portion of the at least one URL is capable of being manually entered by a user, wherein the identifiers and the at least one URL are stored on a user device with the network browser executable thereon; and storing the identifiers on a sever in communication with the user device via a network;

wherein the identifiers and information associated with the identifiers are stored at both the user device and the server.

22. A system, comprising:

a server;

computer code for working in association with a network browser including a back button, a forward button, a refresh button, and a home button; and for displaying a list including a plurality of identifiers in a portion of a graphical user interface separate from a window in which content associated with uniform resource locators (URLs) is displayed; and computer code for allowing a user to select, by clicking, during use of the network browser, one of the identifiers in the portion of the graphical user interface separate from the window in which the content associated with the URLs is displayed, for correlating, after the selection, a plurality of the URLs with the selected identifier in a manner that is based on the selected identifier which is distinct with respect to the plurality of URLs;

wherein the user is allowed to manually enter at least one of the identifiers which is distinct with respect to the plurality of URLs;

wherein the identifiers and the plurality of URLs are stored on a user device with the network browser executable thereon; and the server being in communication with the user device via the Internet, the server for storing the identifiers;

wherein the identifiers and information associated with the identifiers are stored at both the user device and the server;

wherein the portion of the graphical user interface includes another window that is situated, at least in part, in front of the window in which the content associated with the URLs is displayed, the other window being displayed in response to a mouse click.

23. A system as recited in claim 22, wherein any content selected during use of the network browser results in automatic correlation of the content with the manually entered selected identifier which is distinct with respect to the plurality of URLs.

* * * * *

UNITED STATES PATENT AND TRADEMARK OFFICE
CERTIFICATE OF CORRECTION

PATENT NO. : 7,305,625 B1 Page 1 of 1
APPLICATION NO. : 10/691061
DATED : December 4, 2007
INVENTOR(S) : Kevin J. Zilka et al.

It is certified that error appears in the above-identified patent and that said Letters Patent is hereby corrected as shown below:

Column 6, line 45 change "lest" to --least--;
Column 7, line 7 change "sever" to --server--.

Signed and Sealed this

Eighth Day of April, 2008

JON W. DUDAS
*Director of the United States Patent and Trademark Office*

INTER PARTES REEXAMINATION CERTIFICATE (0179th)
United States Patent
Zilka et al.

(10) Number: US 7,305,625 C1
(45) Certificate Issued: Aug. 3, 2010

(54) DATA NETWORKING SYSTEM AND METHOD FOR INTERFACING A USER

(75) Inventors: Kevin J. Zilka, San Jose, CA (US); Dominic M. Kotab, San Jose, CA (US)

(73) Assignee: Aloft Media, LLC, Longview, TX (US)

Reexamination Request:
No. 95/000,439, Feb. 6, 2009

Reexamination Certificate for:
Patent No.: 7,305,625
Issued: Dec. 4, 2007
Appl. No.: 10/691,061
Filed: Oct. 22, 2003

Certificate of Correction issued Apr. 8, 2008.

Related U.S. Application Data (63) Continuation-in-part of application No. 10/254,410, filed on Sep. 24, 2002, now abandoned.
(60) Provisional application No. 60/324,941, filed on Sep. 24, 2001.

(51) Int. Cl.
*G06F 3/00* (2006.01)

(52) U.S. Cl. .................................................. 715/739
(58) Field of Classification Search ......................... None
See application file for complete search history.

(56) References Cited

U.S. PATENT DOCUMENTS

| | | | |
|---|---|---|---|
| 5,917,491 A | 6/1999 | Bauersfeld | |
| 6,037,934 A | 3/2000 | Himmel et al. | |
| 6,041,360 A | 3/2000 | Himmel et al. | |
| 6,314,423 B1 | 11/2001 | Himmel et al. | |
| 6,493,702 B1 | 12/2002 | Adar et al. | |
| 6,546,393 B1 | 4/2003 | Khan | |
| 6,973,456 B1 | 12/2005 | Elgart | |

FOREIGN PATENT DOCUMENTS

EP 1030247 A2 8/2000

OTHER PUBLICATIONS

"Kappa Infotech Private Limited," (Communication) (2000). Located at <http://web.archive.org/web/20010304105224/http://www.kappa.net.in/internet/netscape.htm>, last visited on Feb. 4, 2009. (20 pages).
Archived Webpages from Blink.com.
Archived Webpages from Clickmarks.com.
Archived Webpages from SpotOn.com.
Chakrabarti, S. et al. (2000). "Using Memex to Archive and Mine Community Web Browsing Experience," Computer Networks 33:669–684.

*Primary Examiner*—Andrew L Nalven (57) ABSTRACT

An interface is provided for data networking. Included is a network browser window associated with a network browser for displaying content associated with uniform resource locators (URLs) during network browsing. Also displayed is a plurality of identifiers adjacent to or separate from the window in which the content is displayed. In use, a user is allowed to pre-select at least one of the identifiers. Moreover, after the pre-selection, content associated with at least one URL displayed during use of the network browser is correlated with the pre-selected identifier.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-23 are cancelled.

\* \* \* \* \*